Patented May 11, 1926.

1,584,618

UNITED STATES PATENT OFFICE.

AUSTIN H. HART, OF GREENWICH, CONNECTICUT, ASSIGNOR TO ROME RADIATION COMPANY, INC., OF ROME, NEW YORK.

PROCESS FOR ELECTRICALLY WELDING HIGHLY-ELECTRICALLY-CONDUCTIVE MATERIALS.

No Drawing.   Application filed September 23, 1925. Serial No. 58,194.

This invention relates to a process for electrically welding highly electrically conductive materials, particularly materials such as copper and brass or similar alloys. It is a common practice to electrically weld high resistance materials such as steel and iron by bringing the surfaces of the materials to be welded in the closest possible contact by high pressure and passing sufficient electric current through said materials to cause their surfaces to weld. Numerous attempts in the past have been made to weld highly electrically conductive materials by this method without success, as the very low resistance of these materials prevented development of sufficient heat by the passage of the electric current between the surfaces of the materials to effect the weld before the entire materials were reduced from a solid to a fluid condition and squeezed out from between the electrodes.

The object of the invention is to provide a process whereby highly electrically conductive materials may be welded together.

This object is accomplished by creating an artificial resistance to the passage of the electric current through the materials to be welded as it passes between the electrodes during the welding operation.

In order to accomplish the above object experiments were made at various pressures and it was found that by bringing the surfaces of the highly electrically conductive materials, such as copper or brass, in contact between the electrodes with a pressure not greater than 400 pounds nor less than 100 pounds, according to the composition and thickness of the materials, the passage of the electric current through such materials will cause them to be welded without burning or deteriorating the same.

By way of illustration it was found that brass sheet composed of 66% copper and 34% zinc required an approximate pressure of 235 pounds to effect the best weld. An increase in copper content and a decrease in zinc content would require a lesser pressure to be applied or a decrease in copper content and an increase in zinc content would require a greater pressure to accomplish the best results. However, the pressure in no case would be greater than 400 pounds nor less than 100 pounds at the point between the electrodes.

What I claim is:

An electrical welding process consisting in bringing together highly electrically conductive material, subjecting the materials between the electrodes to a pressure less than 400 pounds but greater than 100 pounds according to the composition and thickness of the materials to be welded and then passing an electric current through the electrodes and the materials so as to develop sufficient heat between the surfaces of the materials to effect a weld.

In testimony whereof I affix my signature.

AUSTIN H. HART.